April 19, 1927.
R. A. LINQUIST
1,625,555
TRANSMISSION COVER FOR FORDS
Filed June 5, 1926
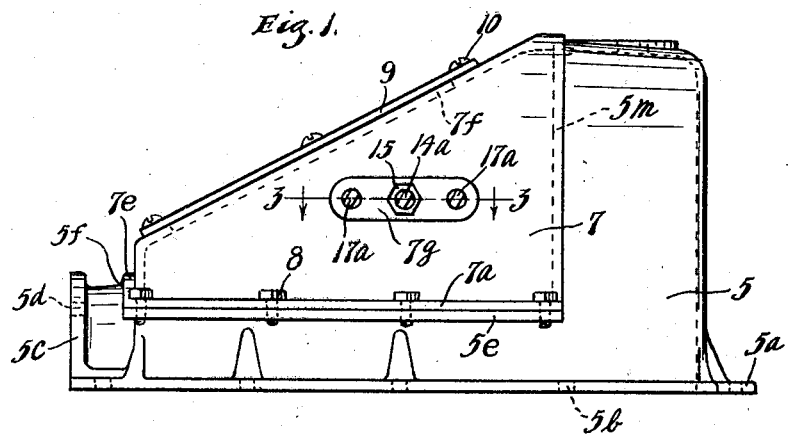
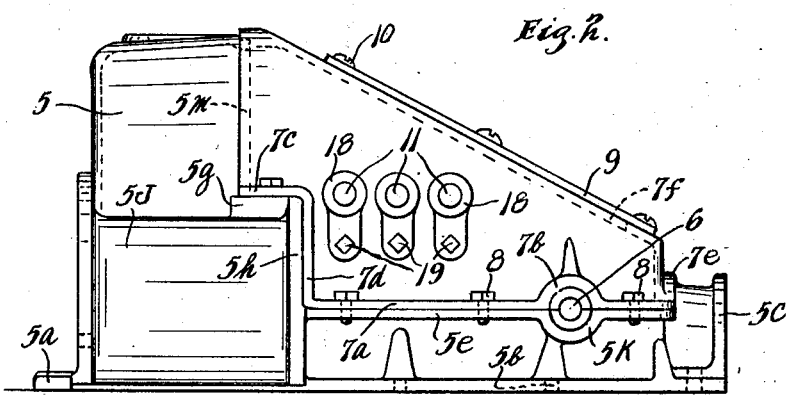
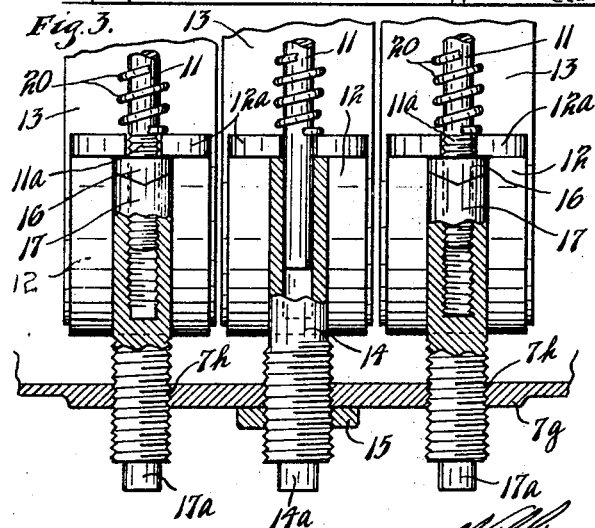
INVENTOR.
RICHARD A. LINQUIST.
BY HIS ATTORNEYS.

Patented Apr. 19, 1927.

1,625,555

UNITED STATES PATENT OFFICE.

RICHARD A. LINQUIST, OF MINNEAPOLIS, MINNESOTA.

TRANSMISSION COVER FOR FORDS.

Application filed June 5, 1926. Serial No. 113,951.

This invention relates to a transmission casing for an automobile and particularly to a cover for such a transmission casing or a divided transmission casing, and while the invention is applicable to various types of machines, it is particularly designed for, and in the embodiment of the invention is illustrated as applied to, a transmission casing of the well known Ford automobile. In the standard Ford construction, the transmission casing is divided and the parts thereof connected in a horizontal plane passing substantially through the axis of the crank shaft of the engine. There is also a small cover plate on the top of the casing. The opening afforded by this cover plate, however, is not sufficient to permit access to the transmission casing for a great many repair jobs that frequently have to be made. It is thus necessary to take off the top half of the casing. This is quite a task and usually requires several hours of a workman's time. Furthermore, it is difficult to get this top section of the casing fitted back tightly into place.

It is an object of this invention, therefore, to provide a transmission casing for a Ford or other automobile having a cover or section which can easily and quickly be removed and replaced, and which will give ample access to the interior of the casing for performing the necessary repair operations.

It is a further objection of the invention to provide a transmission casing for a Ford or other automobile, having a removable section which is connected at its bottom to the main upper section of the casing in a horizontal plane, passing substantially through the axis of the clutch lever and slow speed connection shaft whereby said removable section may be lifted with the pedal shafts therein and the said clutch lever and slow speed connection shaft may then be easily removed.

It is still another object of the invention to provide a transmission casing having a removable section, as set forth in the preceding paragraph, having means extending therethrough for adjusting the brake bands of the transmission.

These and other objects and advantages of the invention will be fully set forth in the following description made in connection with the accompanying drawings, in which like reference characters refer to similar parts throughout the several views and in which:—

Fig. 1 is a view in side elevation of the device, as seen from one side;

Fig. 2 is a side elevation of the device as seen from the opposite side; and

Fig. 3 is a partial section taken on line 3—3 of Fig. 1 as indicated by the arrows, and shown on an enlarged scale.

Referring to the drawings, the upper half of the standard transmission casing such as used on a Ford automobile, is indicated as 5. This casing or section has a lower flange $5^a$ adapted to seat on a similar flange on the lower half of the casing and to be connected thereto by bolts passing through the holes $5^b$. The casing also has a rear flange $5^c$ which is provided with holes $5^d$ through which pass attaching screws or bolts connecting the same to another portion of the transmission casing. In accordance with the present invention, the casing 5 is provided with an intermediate horizontal flange $5^e$ at each side, the top of this flange being disposed in a horizontal plane disposed substantially in the axis of the clutch lever and slow speed connection shaft 6 which projects at one side of the casing. The casing 5 also has a semi-cylindrical flange $5^f$ at its rear portion, some distance in front of the flange $5^d$ and at one side has the additional horizontal flange $5^g$ and a vertical flange $5^h$ disposed at one end of the top and the rear side of the box like portion $5^j$ which is provided for the starting motor of the automobile. A removable section or cover 7 is provided for the casing which has a bottom horizontal flange $7^a$ resting and fitting on the flange $5^e$. At one side of the flange $5^e$ has a semi-cylindrical section or hub $5^k$ and the flange $7^a$ has a similar semi-cylindrical portion or hub $7^b$ which portions $5^k$ and $7^b$ register and are adapted to enclose the shaft 6. The casing 7 also has a horizontal flange $7^c$ adapted to rest on the flange $5^g$ and has a vertical flange $7^d$ adapted to fit against and engage the flange $5^h$. In practice a thin gasket preferably will be disposed between the flanges $7^a$, hub $7^b$, flanges $7^c$ and $7^d$ and the corresponding flanges on the casing 5 and said flanges are adapted to be connected and the removable section 7 secured in place by the cap screws 8. The casing 7 at its rear end has a semi-cylindrical flange $7^e$ adapted to fit over the flange $5^f$ on casing 5 and at its front side the casing 7 overlaps the casing 5, the casing 5 extending under the rear edge of the casing 7, the front edge of this portion of the casing 5 being indicated at 5ᵐ. When the section or cover 7 is removed, therefore, there will be a large opening exposed in the casing 5 extending from the flange 5ᵉ to the flange 5ᶠ and to the edge 5ᵐ. The section 7 also has an opening 7ᶠ in its top portion which top is flat and inclined downwardly toward the rear. The opening 7ᶠ is covered by a flat cover plate 9 similar to the cover plate used in the standard construction, the cover plate 9 being held in place by the screws 10. The section 7 also has an oblong boss 7ᵍ at one side thereof having therein the spaced tapped holes 7ʰ. These holes are alined with the rods 11 which are used for connecting the ends and adjusting or tightening the brake bands 12 which extend about the brake drums 13 which are disposed in the casings 5 and 7. In the standard Ford construction the central rod 11 has a sleeve 14 surrounding the same and having a threaded portion extending through a threaded hole in the casing, the sleeve 14 having a flat head 14ᵃ by which it may be turned in the casing 7 and being held in adjusted position by the lock nut 15. The members 14 and 15 are used in the present construction, the sleeve 14 extending through the casing 7 and the boss 7ᵍ. In the standard construction the other members 11 have threaded ends 11ᵃ projecting through the upwardly extending lugs 12ᵃ on the brake bands and having thereon the washers 16. These washers have V-shaped or ridged outer surfaces and are usually engaged by nuts of the regular hexagon type having inner surfaces fitting over the said V-shaped or ridged surfaces. The bands 12 are maintained in open or loose position by the usual springs 20. In the present construction the nuts are replaced by sleeves 17 having threaded bores in their inner ends adapted to screw onto the threaded ends 11ᵃ. The inner ends of the sleeves 17 are of V-shape and adapted to fit over the V-shaped outer surfaces of the washers 16. The sleeves 17 are exteriorly threaded adjacent their outer ends and threaded into the tapped holes in the boss 7ᵍ, said sleeves 17 having flat heads 17ᵃ by which they may be turned. On the other side of the casing 7 the rods 11 project through said casing and are disposed in bearings 18 which are secured to the casing 7 by the usual bolts 19. The ends of the rods 11 adjacent bearings 18 receive the operating pedals for the brake bands.

In operation, when the casing is in use, it will be secured together as shown in Fig. 1. The brake shafts or rods 11 and the clutch pedal and slow speed connection shaft 6 will have the usual levers connected thereto. If it is desired to tighten any of the brake bands, this can be done by merely turning the sleeves 14 or 17. It will be noted that in the present construction the sleeves 17 can be turned from the outside of the casing. This is not so in the standard construction. The sleeves 17 can be given a half turn and the inner ends will slip or move relatively to the washers 16 when the V-shaped surfaces will again engage and the sleeves 17 will be thus held from rotation. It may be stated that the washers 16 so engage the rods 11 that they cannot rotate relatively thereto. When repairs are to be made inside of the casing, the cover 7 can be quickly removed by merely removing the screws 8. The pedal shafts or rods 11 will be removed with the casing 7 and will merely be lifted out of the forked ends of the brake band lugs 12ᵃ. When the casing 7 is removed, the shaft 6 will be exposed and this shaft can thus be quite readily removed and replaced and any necessary repairs or changes can be made on the parts carried thereby. When the section 7 is removed, ample access is given to the interior of the casing 5 for all necessary repairs. To make such repairs in the standard construction the entire upper section 5 must be removed and this takes quite a long time. With applicant's construction the section 7 can be removed in a few minutes and access is given to the inside of the casing 5 as above stated, for making all repairs which are usually necessary. A great saving of time is therefore effected by the use of applicant's device. The applicant is a person with long experience in performing the necessary repairs and other operations on the transmission and has worked out the present invention from his actual experience.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:

1. A casing for the transmission mechanism of an automobile, having a planetary transmission, pedal-controlled brake drums for operating the same, and a clutch lever shaft connected to one of said pedals and extending across said casing below said pedals, comprising an upper section, said section having connecting flanges disposed in a horizontal plane passing through the center of the crank shaft of the motor and adapted to be secured to a lower section of said casing, such upper section also having another removable section thereon, said upper section and removable section having connecting flanges meeting in a horizontal plane passing substantially through the center of the clutch lever shaft, said removable section having semi-cylindrical portions at its front and rear ends fitting over similar sections on said upper section.

2. A casing for the transmission mechanism of an automobile having a planetary transmission, pedal-controlled brake drums for operating the same, and a clutch lever shaft connected to one of said pedals and extending across said casing below said pedals, comprising an upper section, said section having connecting flanges disposed in a horizontal plane passing through the center of the crank shaft of a motor, such upper section also having another removable section thereon, said upper section and removable section having connecting flanges meeting in a horizontal plane passing substantially through the center of the clutch lever shaft, said removable section having semi-cylindrical portions at its front and rear ends fitting over similar portions on said upper section, said removable section also having a boss at one side having tapped holes therein, sleeves extending through said holes engaging the brake band rods and adapted to be turned from the outside of the casing for adjusting said brake band rods.

3. A casing for the transmission mechanism of an automobile having a planetary transmission, pedal-controlled brake drums for operating the same, and a clutch lever shaft connected to one of said pedals and extending across said casing below said pedals, comprising a lower section and an upper section, said sections having connecting flanges meeting in a horizontal plane passing through the center of the crank shaft of the motor, said upper section having a removable section thereon, said removable section having horizontal flanges at each side with their lower surfaces disposed in a horizontal plane passing through the axis of the clutch lever shaft, said removable section also having semi-cylindrical portions at its front and rear fitting over similar portions on said upper section, said upper section having a horizontal flange with its top surface also disposed substantially in the plane of said clutch lever and slow speed connection shaft and spaced means connecting said flange to said horizontal flange on said removable section, said flanges having semi-cylindrical hubs embracing said clutch lever and slow speed connection shaft.

4. A casing for the transmission mechanism of an automobile having a planetary transmission, pedal controlled brake drums, rods for operating the same and a clutch lever shaft connected to one of said pedals and extending transversely of said casing comprising an upper section, said section having connecting flanges disposed in a horizontal plane passing through the center of the crank shaft of a motor, a number of bolts connecting said sections, said upper section also having another removable section thereon, said upper section and removable section having connecting flanges meeting in a horizontal plane passing substantially through the center of said clutch lever shaft, a smaller number than said number of bolts connecting said upper and removable sections, said removable section having semi-cylindrical portions at its front and rear ends fitting over similar portions on the said upper section, said removable section also having a boss at one side and means extending through said boss engaging the brake band rods and adapted to be turned from the outside of the casing for adjusting said brake band rods.

In testimony I affix my signature.

RICHARD A. LINQUIST.